United States Patent [19]

Picard et al.

[11] 4,393,597
[45] Jul. 19, 1983

[54] STABILIZED SIGHTING DEVICES FOR VEHICLES

[75] Inventors: Jean-François Picard, Versailles; Paul Jacquard, le Peco, both of France

[73] Assignee: Societe D'Applications Generales, Paris, France

[21] Appl. No.: 220,895

[22] Filed: Dec. 29, 1980

[30] Foreign Application Priority Data

Dec. 26, 1979 [FR] France ................ 79 31721

[51] Int. Cl.³ ........................... G01C 15/14
[52] U.S. Cl. .................. 33/275 G; 33/236;
33/318; 89/41 EA; 356/149; 356/248
[58] Field of Search .......... 33/236, 318, 275 G,
33/230; 89/41 EA; 356/149, 248

[56] References Cited

U.S. PATENT DOCUMENTS 2,684,007 7/1954 Newell ...................... 356/248 X
3,471,931 10/1969 Bezu .......................... 356/248
3,518,016 6/1970 Burdin et al. ............... 33/318 X
4,015,905 4/1977 Lloyd ........................ 33/230
4,062,126 12/1977 O'Hara et al. ............... 33/236

Primary Examiner—William D. Martin, Jr.
Attorney, Agent, or Firm—Larson and Taylor

[57] ABSTRACT

A stabilized sighting device for use on a carrier comprises an outer unit mounted for rotation about a bearing axis which may be parallel to the yaw axis of the carrier. An intermediate unit is mounted for rotation on the outer unit about an elevation axis and a sight unit provided with a gyro is mounted on the intermediate unit for rotation within a predetermined angular range about an inner axis located in a plane perpendicular to the elevation axis. First and second motors are provided for driving the intermediate unit and the sight unit about the intermediate and inner axes, respectively and are controlled by first and second servo loop circuits receiving signals from the gyroscope. A detector delivers a signal representative of the deviation of the inner unit from the canonical position and a position reproducing loop controlled by the detector actuates a motor driving the outer unit. The configuration of the outer gimbal is preferably reversed for decreasing the perturbating torques.

7 Claims, 3 Drawing Figures

STABILIZED SIGHTING DEVICES FOR VEHICLES

BACKGROUND AND SUMMARY OF THE INVENTION

The present invention relates generally to a stabilized sighting device suitable for use on all types of vehicles, while of particular interest on low speed aircraft such as helicopters.

Most stabilized sighting devices utilized in the past have included a core unit provided with a gyro and including the payload, which may include sensors and/or illuminators, mounted on a second unit for rotation about an axis (typically an elevation axis). The second unit is mounted on the vehicle for rotation about another axis (typically a bearing or azimuth), transversal to the first axis, by a motor or torquer controlled by a servoloop.

Often times, the device should have the ability to operate within a large range of positive and negative angular positions about the elevation axis. For instance, aiming sights for land vehicles, nose mast or fuselage mounted sights for helicopters should accept movements of considerable amplitude while maintaining a satisfactory accuracy and resolution in spite of movements and vibrations of the support. On the other hand, stabilization about the line of sight is generally unnecessary.

In such prior art devices where the motor for angularly locating the second (bearing) axis is controlled by a servo control loop, parasitic or perturbating inertial torques $C_e$ are applied about that axis, which constitutes an external axis:

$$C_e = (I_g + I_\nu)\dot{\omega} \tan s \qquad (1)$$

where $I_g$ is the moment of inertia of the first unit (bearing gimbal in general) alone, about the external axis (bearing axis);

$I_\nu$ is the moment of inertia of the core about the sighting line;

$\dot{\omega}$ is the rotational acceleration about an axis perpendicular to the other two axes (elevational axis and bearing axis), i.e. an axis which is the roll axis at zero bearing;

s is the elevation angle.

Torque C becomes high when tan s becomes substantial, i.e. when the system is far away from the canonical position, in which the sighting line is orthogonal to the two rotation axes (bearing and elevational axes).

In view of the large values of torque C at high elevation angles, proper design of the system and determination of the stabilizing residuum imply that the actions to which the device will be subjected (particularly angular accelerations and energizing frequencies) are perfectly known, which is far from being always the case.

This problem is very different from those which arise in the construction of platforms stabilized along three axes and comprising gimbals mounted about pitch, roll and azimuth axes; the latter problems include flip of the roll gimbal when the amount of pitch exceeds 90°. The use of two roll gimbals in cascade has been provided in this case, i.e. an inner gimbal having a small range of freedom and an outer gimbal equipped with a motor controlled by a synchrotransmitter carried by the internal gimbal (U.S. Pat. No. 3,188,870): the purpose of this arrangement is to facilitate flip. Applicants have found that a fundamentally different problem exists in respect of sighting devices in which the core has a much higher mass and inertia and consists in decreasing the incidence of the characteristics of the carrier on those of the device, by minimizing the multiplication coefficient of $\dot{\omega}$ in the expression of the preponderant parasite torque in formula (1).

It is an object of the invention to provide a sighting device in which the tangent term of formula (1) is rendered small by maintaining the stabilizing system in a position close to the canonical position, whatever the elevation of the sighting line.

It is a more general object to provide an improved sighting device which has a high degree of accuracy when mounted on a vehicle.

According to the invention, a stabilized sighting device comprises a first gimbal unit mounted for rotation about an external axis, a drive motor for rotating said first gimbal unit about said external axis, a second gimbal unit mounted for rotation on said outer unit about an intermediate axis perpendicular to said external axis, and a sight unit provided with a gyroscope and mounted on aid second gimbal unit for rotation within a predetermined limited angular range about an inner axis located in a plane perpendicular to said intermediate axis. First and second motor means are provided for driving said second gimbal unit and sight unit about said intermediate and inner axes respectively. First and second servo loop circuits are connected to first and second outputs of said gyroscope for controlling said first and second motor means, respectively. Detector means are arranged to deliver a signal representative of the deviation of said first gimbal unit from the canonical position. A position reproducing loop controlled by said detector means actuates said drive motor.

In such a device, stabilization is obtained by controlling the motors of the angular movement servo loops about the intermediate and inner axes (elevational and "lateral" movement axes in most cases) directly from signals supplied by the gyro, whose spin axis is located parallel to the line of sight. A correction network will be provided in each loop for ensuring stability of the servocontrol.

On the other hand, the motor for moving the first gimbal unit angularly is controlled by a simple position copy system. The latter should fulfil one important condition: under all operating conditions, it must have a sufficiently low time constant for the angular deflection assumed by the sight unit about the inner axis to be small, typically within a range which does not exceed one to a few degrees. Thus, the sensitive axes of the gyroscope and the rotational axes about which rotation is controlled by the servo-control motors always remain practically co-linear and no network for compensating variations of the mechanical gain depending on the angular extent of movement about the intermediate axis (elevation angle) is necessary.

The position copying loop will comprise a compensation network for compensating variations of the mechanical gain responsive to angular amplitude of movement about the intermediate axis. But the implementation of such a compensation network raises much less problems than in a stabilization loop. One reason is that a stabilization loop must provide maximum values of stiffness and passband, which requires high gains and phase advance networks. To the contrary, the gain of the position copying system can be relatively low.

In the device of the invention, the critical or relevant parasitic torque is torque $C_s$ about the axis of the second unit (elevation axis in general) rather than torque $C_e$. It is given by the formula:

$$C_s = (I_v + I_s)\dot{\omega} tg\, l \qquad (2)$$

where $I_s$ is the inertia of the second unit (elevation gimbal in general) about the intermediate axis, such assembly being considered alone, to the exclusion of the sight unit, $\dot{\omega}$ is the acceleration about the axis perpendicular to the elevation axis and "lateral" movement axis;

l is the "lateral" movement angle (angle between the line of sight and the axis perpendicular to the elevation axis and lateral movement axis).

The arrangement which has just been described substantially decreases the effects of the torques which appear about the intermediary axis. To further improve the performance, it is desirable to reduce the amplitude of the torque. In an attempt to reduce $I_s$, the assembly consisting of the sight and second unit will be advantageously given an inverted structure. Instead of forming the second unit as a fork straddling the sight unit, bulky parts of the latter will be located in parts placed on both sides of the second assembly and may thus have a low rotational inertia. Reduction of $I_s$ may be accompanied by an increase in $I_v$, but the latter will generally be lower and the overall effect will be of advantage.

It will be appreciated that the favorable effect of the latter arrangement only exists because of implementation of the first one, which causes $I_s$ to appear in the parasite torque to be taken into consideration (formula 2).

The invention will be better understood from the following description of particular embodiments thereof, given by way of examples only.

SHORT DESCRIPTION OF THE DRAWINGS

DETAILED DESCRIPTION OF PREFERRED EMBODIMENTS

Figure 1:
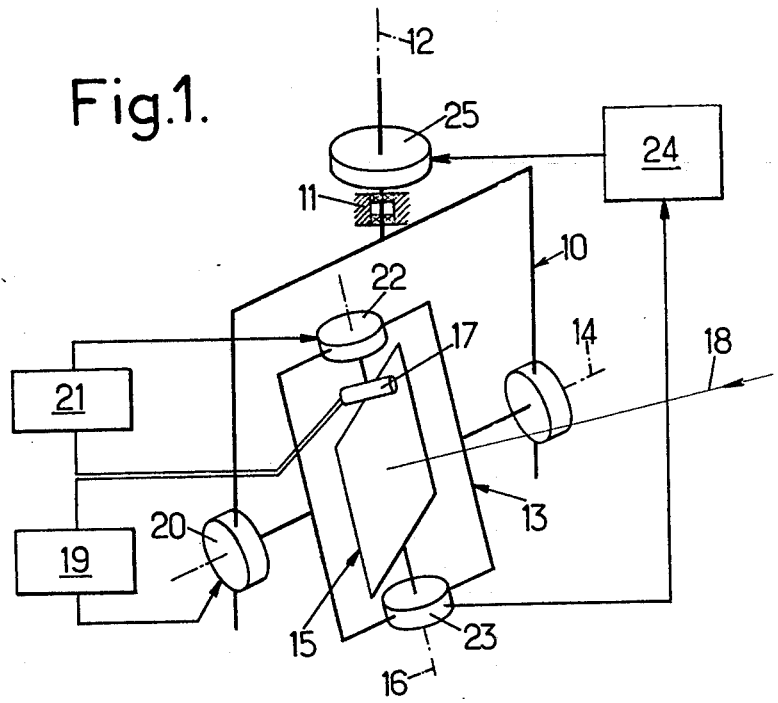
FIG. 1 is a simplified diagram showing the components of a stabilized sighting device in accordance with the invention.

Referring to FIG. 1, there is shown a stabilized sighting device which comprises a first unit 10 formed by a gimbal mounted on a fixed support for rotation about an axis 12, which will be assumed in the following to be the bearing axis (typically parallel to the yaw axis of the carrying vehicle). The first unit 10, forming a bearing gimbal, supports a second unit 13 by bearing means disposed so that the second unit may rotate about an intermediate axis 14 perpendicular to the first axis and forming an elevation axis. The second unit 13 supports the sight unit 15 of the sighting device. The core 15 is not fixed to the second unit 13, but supported by bearing means for rotation about an internal axis 16, which will be referred to as a lateral movement axis, located in a plane perpendicular to elevation axis 14, like the bearing axis 12.

A stabilization control two-axis gyro 17 is mounted directly on core 15. The spin axis of the gyroscope 17 is directed along line of sight 18. One of the input axes of the gyroscope is directed along the lateral movement axis 16 and the other input axis is then at an angle with elevation axis 14, which is equal to the angle of deviation of the core about the lateral movement axis, from the canonical position as defined above.

The core 15 and second assembly 13, in the form of an elevation gimbal, are each provided with a stabilizing closed loop servo-control circuit whose detector is gyroscope 17. The elevation stabilizing loop comprises electronic circuit means 19 for controlling an elevation motor 20. Similarly the lateral movement servo-control loop comprises circuit means 21 which receives input signals from gyroscope 17 and which controls a motor 22 for angularly moving the core about the bearing axis.

As already indicated above, the device must be designed so that the gyroscope 17 deviates little from the canonical position, i.e. from the position in which the sensitive axes of gyroscope 17 are parallel to the axes about which the stabilizing motors 20 and 22 rotate the respective units. For that purpose, the first unit 10 (bearing unit 10) is caused to rotate so that the angle of deviation of the core about the lateral movement axis 16 remains quite small. The first unit 10 is provided with a copying or position reproducing system comprising a detector 23 detecting the rotations of core 15 about the lateral movement axis, an electronic processing circuit 24 and a motor 25 for rotating unit 10.

Under these conditions, the angular movements of core 15 about the lateral movement axis 16 are limited to a very low amplitude, typically limited to a range not exceeding a maximum which may be of from one to a few degrees depending upon the required accuracy. In practice, the amplitude will be frequently less than a degree since it corresponds solely to the copy errors. The copying system comprises a network for compensating variations of the mechanical gain of the linkage as a function of the elevation. The compensating network may be quite simple, since the gain of the system is not critical, which would not be the case in a stabilization loop.

The system may be conventional in design. It will generally comprise a potentiometric or inductive sensor 23, a low-gain copy system with a compensation network and a drive motor. The whole system may be analog and may control motor 25 by pulse width modulation of DC square waves in response to the measured deviation. The compensation network may consist of an amplifier whose gain is modified by steps responsive to the value of the elevation angle to approximate the theoretical compensation law. The elevation stabilization loop will comprise an electronic circuit having a higher amplification gain, but it will not comprise a network for compensating variations of the mechanical gain, due to the small extent of rotation of the core about the lateral movement axis 16.

Last, the loop for stabilization about the lateral movement axis may be quite simple in design, considering the low value of the angular movements of core 15. In particular, the drive motor may be of a type having a very small angular range of movement (brushless motor for example).

It can be seen that the device of the invention removes the limitations in the stabilization caused by large elevation angular fields. This angular field will now be limited by optical or mechanical problems only. There is no need for a full analysis of the forces to which the device will be subjected in operation, and particularly the perturbating frequencies and accelerations of the carrier.

Figure 3:
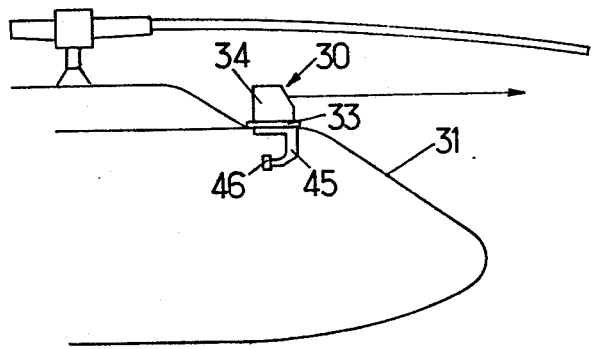
FIG. 3 is a sketch illustrating how the device of FIG. 2 may be mounted on a helicopter.
Figure 2:
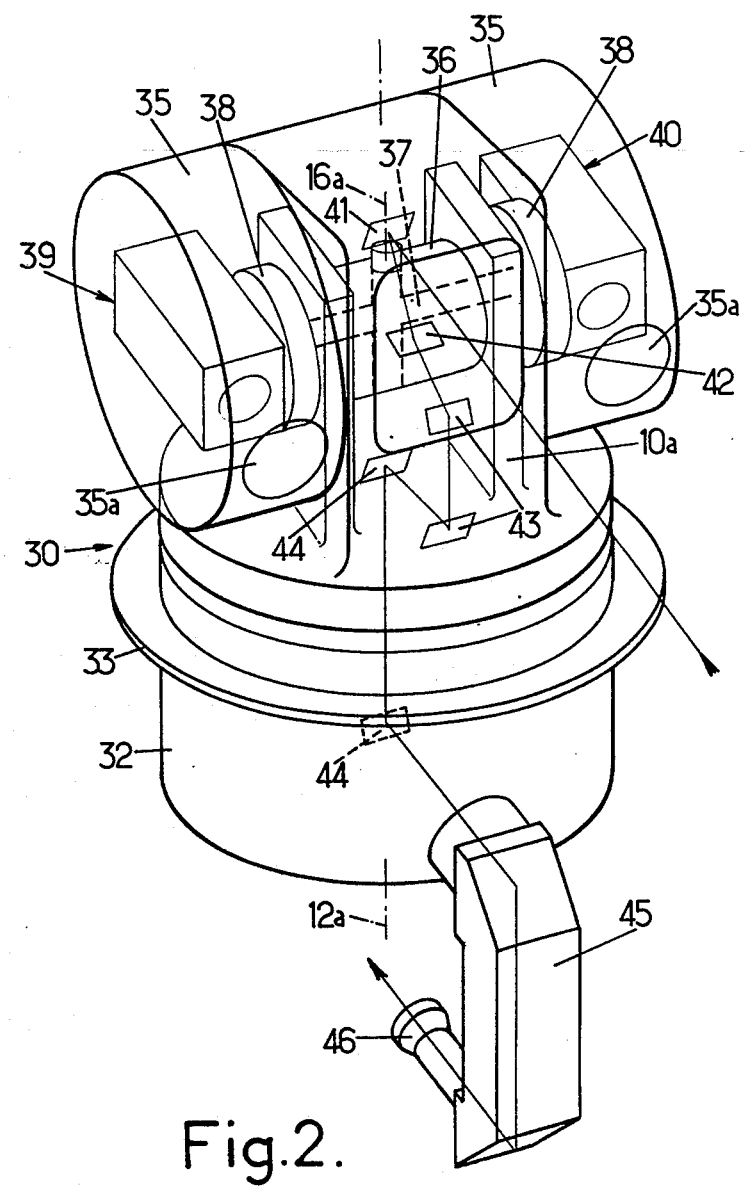
FIG. 2 is a phantom isometric view showing a typical distribution of the components of a sighting device in accordance with the invention, for use as a roof sight on a helicopter.

There is shown schematically in FIGS. 2 and 3 a device 30 for use on a helicopter schematically shown at 31. It comprises an external casing 32 having a flange 33 for roof mounting. In FIG. 3, the case is shown provided with a shroud 34 for protecting the active parts. In FIG. 2, the shroud is replaced by cylindrical bulges 35 provided with windows 35a.

The geometry of the device shown in FIG. 2 is reversed with respect to that shown in FIG. 1. The first unit 10a is formed by a gimbal which projects axially upwardly from its support, instead of downwardly in FIG. 1; the more bulky parts of the core are placed on each side of the first unit (instead of being placed between the branches of the gimbal which forms it), which reduces considerably the moment of inertia of the first unit 10a about the bearing axis 12a and that of the second unit about the elevation axis 14a.

In the device shown in FIG. 2, where the elements corresponding to those of FIG. 1 are shown by the same reference number to which the index a has been added, the second or intermediate unit comprises a tubular sleeve 36. Two lateral plates 38 located each on one side of the first unit 10a are connected by a shaft 37. The plates carry the sensors: for example, one of plates 38 may carry an assembly 39 formed by a laser range finder and a TV camera; the other plate 38 may then carry a thermal IR camera 40. Shaft 37 may project through elongated passages in the two legs of the first unit 10a and constitutes a section of a cross shaped piece shose other branches are directed along the lateral movement axis 16a and support the core. For the sake of clarity, FIG. 2 only shows the lateral movement mirror 41 of a system for optical sighting from the cabin of the helicopter. The optical system may comprise successively, along the path of the incident light from the line of sight 18a, the lateral movement mirror 41, an elevation mirror 42 carried by the second assembly, two deflecting mirrors 43, the bearing mirrors 44 and a sight fitted with an eyepiece 46.

A device of the kind illustrated in FIG. 2 has been designed which achieves stabilization with an accuracy of 30 μrad for angular accelerations as high as 6 r/s$^2$ and frequencies exceeding 70 Hz.

Furthermore, it can be seen that the arrangement shown in FIG. 2 allows easy access to the different sensors for maintainance repair or replacement.

It is clear that the invention is not limited to the particular embodiments shown and described by way of examples and it should be understood that the scope of the present patent extends to variations which will appear to those familiar with the art to which the invention relates.

We claim:
1. A stabilized sighting device comprising:
    a first gimbal unit mounted for rotation about a first axis;
    a drive motor for rotating said first gimbal unit about said first axis;
    a second gimbal unit mounted for rotation on said first gimbal unit about a second axis perpendicular to said first axis;
    a sight unit provided with a gyroscope and mounted on said second gimbal unit for rotation within a predetermined limited angular range with respect to a predetermined reference position which is a canonical position about a third axis perpendicular to said second axis;
    first and second motor means for driving said second gimbal unit and sight unit about said second and third axes, respectively;
    said gyroscope having a first sensitive axis located parallel to said second axis when the sight unit is in said predetermined reference position about said third axis, and a second sensitive axis parallel to said third axis;
    first and second servo loop circuits connected to first and second outputs of said gyroscope for controlling said first and second motor means, respectively;
    detector means arranged to deliver a signal representative of the deviation of said sight unit from the canonical position with respect to the second gimbal unit;
    and a position copying loop controlled by said detector means and activating said drive motor in a direction tending to compensate said deviation, whereby said second servo loop returns said sight unit to said predetermined reference position which is a canonical position.

2. A device according to claim 1, wherein said second sensitive axis of said gyroscope is its spin axis.

3. A device according to claim 1, wherein each said servo loop circuit includes a stabilization correction network.

4. A device according to claim 1, wherein said position copying loop is arranged to maintain the deviation of said sight unit about said third axis wherein a range of some degrees at most.

5. A device according to claim 1, wherein said position copying loop has a compensation network for compensating the variation of the mechanical amplification gain responsive to the angular movements of the second gimbal unit about said second axis.

6. A device according to claim 1, wherein the sight unit has certain components which are more bulky than other components thereof and wherein the said more bulky components of the sight unit are located along the second axis on both sides of said first gimbal.

7. A stabilized sighting device according to claim 1, wherein said device is carried on a vehicle having pitch and yaw movement, wherein said first axis is a bearing axis substantially parallel to the yaw axis of the vehicle and said second axis constitutes an elevation axis.

* * * * *